United States Patent [19]

Louthan et al.

[11] 4,267,307

[45] May 12, 1981

[54] SEALANT COMPOSITIONS

[75] Inventors: Rector P. Louthan; Richard C. Doss, both of Bartlesville, Okla.

[73] Assignee: Phillips Petroleum Company, Bartlesville, Okla.

[21] Appl. No.: 98,446

[22] Filed: Nov. 29, 1979

[51] Int. Cl.$^3$ .................. C08G 63/68; C08G 75/00
[52] U.S. Cl. .................................. 528/293; 525/438; 528/176; 560/152; 560/154
[58] Field of Search ............... 528/293, 176; 560/152, 560/154; 525/438

[56] References Cited

U.S. PATENT DOCUMENTS

| | | | |
|---|---|---|---|
| 3,258,495 | 6/1966 | LeFave et al. | 260/609 |
| 3,352,810 | 11/1967 | Cameron et al. | 260/30.8 |
| 3,459,787 | 8/1969 | Weesner | 260/470 |
| 3,737,415 | 6/1973 | Kenton | 260/79 |
| 3,817,936 | 6/1974 | Jones et al. | 260/31.8 XA |
| 3,849,381 | 11/1974 | Doss et al. | 528/360 |
| 3,850,886 | 11/1974 | Doss et al. | 260/76 |
| 4,060,519 | 11/1977 | Doss et al. | 260/33.6 R |
| 4,113,707 | 9/1978 | Louthan | 260/76 |

OTHER PUBLICATIONS

Wyandotte Key Chemicals for the Urethane Industry.

*Primary Examiner*—Lucille M. Phynes

[57] ABSTRACT

A sealant composition based on a mercaptan-terminated liquid polymer, fillers, plasticizer, and curing agent wherein the liquid mercaptan-terminated polymer employed is prepared from a mercapto acid or mercapto acid ester and a polyoxypropylene glycol, the polyoxypropylene glycol having been end-capped with ethylene oxide prior to esterification to give primary alcohol terminal groups. The cured sealant based on the ethylene oxide-end capped polymer exhibits a non-tacky surface, whereas a cured sealant based on a propylene oxide end-capped glycol exhibits a tacky surface.

14 Claims, No Drawings

SEALANT COMPOSITIONS

BACKGROUND OF THE INVENTION

This invention relates to non-tacky sealant compositions based on a mercaptan-terminated liquid polymer. In accordance with another aspect, this invention relates to sealant compositions comprising liquid mercaptan-terminated polymers prepared from at least one of a mercapto acid and a mercapto acid ester and a primary hydroxy-terminated polyol. In accordance with another aspect, this invention relates to liquid mercaptan-terminated polymers prepared from at least one of a mercapto acid and a mercapto acid ester and a polyoxypropylene glycol end-capped with ethylene oxide prior to esterification to give primary hydroxy-terminated groups. In accordance with a further aspect, this invention relates to a process of preparing said mercaptan-terminated polymer from a mercapto acid and/or a mercapto acid ester and an ethylene oxide end-capped polyoxypropylene glycol. In accordance with another aspect, this invention relates to non-tacky sealant compositions comprising said mercaptan-terminated liquid polymer, non-elastomeric materials and a curing agent.

Poly(oxyalkylene)-polyester-poly(sulfide)-polythiols are broadly known as shown by U.S. Pat. No. 3,817,936. In one embodiment, this reference prepares the polymer by esterifying a mixture of mercaptocarboxylic and thiodicarboxylic acids with a polyoxypropylene glycol having on the average 2.5 pendant hydroxyl groups per molecule. Another method of preparing said polythiols is reported in U.S. Pat. No. 4,113,707 wherein, in one specific embodiment, a mixture of an alkyl mercaptocarboxylate and a dithiobis(alkylcarboxylate), and polythiobis(alkylcarboxylate) is transesterified with a polyoxypropylene glycol having on the average 2.5 pendant hydroxyl groups per molecule. These materials are quite useful in applications such as sealants. The compositions are normally liquid and can be easily cured with conventional curing agents such as sulfur, or lead peroxide to give a weather resistant flexible cured sealant. However, the cured sealant compositions have an initial surface tack that increases dirt, dust and other foreign matter pick-up. Although this initial surface tack diminishes with time and exposure to water, ultraviolet light and other environmental conditions, it is still desirable to have an elastomeric mercaptan-based sealant composition without initial surface tack. This invention is, therefore, an improvement in the sealant composition described broadly in U.S. Pat. Nos. 3,817,936, 4,113,707 and other poly(oxyalkylene)-polyester-poly(sulfide)-polythiols related inventions.

Accordingly, an object of this invention is to provide sealants based on poly(oxyalkylene)-polyester-poly(sulfide)-polythiol polymers.

Another object of this invention is to provide poly(oxyalkylene)-polyester-poly(sulfide)-polythiols which are curable to sealants having improved properties.

Another object of this invention is to provide cured non-tacky sealant compositions.

Other aspects, objects and the several advantages of this invention will be apparent to those skilled in the art upon a study of this disclosure and the appended claims.

SUMMARY OF THE INVENTION

In accordance with this invention, poly(oxyalkylene)-polyester-poly(sulfide-polythiols having on average more than two pendant thiol groups per molecule are formed by reacting at least one of a mercapto acid and a mercapto acid ester with a primary hydroxy-terminated polyol having on average at least 2.5 pendant primary hydroxyl groups per molecule.

In accordance with one embodiment of the invention, poly(oxyalkylene)-polyester-poly(monosulfide)-polythiols are formed by reacting a mercapto alkanoic acid and a thiodialkanoic acid with a polyether polyol containing on the average at least 2.5 primary hydroxyl groups per molecule.

In accordance with another embodiment of the invention, poly(oxyalkylene)-polyester-poly(disulfide)-poly-thiols are formed by reacting an alkyl mercaptocarboxylate and a polythiobis(alkylcarboxylate) with a polyether polyol containing on the average at least 2.5 primary hydroxyl groups per molecule.

DESCRIPTION OF PREFERRED EMBODIMENTS

A. Mercaptan-Terminated Polymers

Mercaptan-terminated polymers useful in this invention are known by the term poly(oxyalkylene)-polyester-poly(sulfide)-polythiol which is meant to be generic to both poly(oxyalkylene)-polyester-poly(monosulfide)-polythiol and poly(oxyalkylene)-polyester-poly(-monosulfide)-poly(disulfide)-polythiol. These polymers generally have a mercaptan sulfur content varying from about 0.70 to 1.10 wt. % and a viscosity within the range of 3,000 to 20,000 preferably 5,000–10,000 centipoises at 25° C. They are generally prepared by either of two methods: (1) an acid catalyzed esterification of a mixture of mercaptocarboxylic and thiodicarboxylic acids with a polyether polyol having been end-capped with ethylene oxide prior to esterification, or (2) a transesterification of a mixture of alkyl mercaptocarboxylates and polythiobis(alkylcarboxylates) with a polyether polyol having been end-capped with ethylene oxide prior to transesterification.

B. Mercaptocarboxylic and Thiodicarboxylic Acids

The mercaptocarboxylic and thiodicarboxylic acids useful in preparing the mercaptan-terminated polymers of this invention by esterification are described in U.S. Pat. No. 3,817,936, which is incorporated herein by reference. The method of esterification, along with solvents, catalyst, etc., is also disclosed in U.S. Pat. No. 3,817,936, col. 5, line 43 to col. 6, line 27.

As indicated in said patent, one particularly preferred procedure for reacting the mercaptoalkanoic acids and thiodialkanoic acids with the poly(oxyalkylene)-polyol is to use a mixture of mercaptoalkanoic and thiodialkanoic acids. Generally, it is preferred to employ mixtures comprising 5 to 95 weight percent mercaptoalkanoic acid, more preferably 60 to 80 weight percent mercaptoalkanoic acid. Such mixtures of mercaptoalkanoic and thiodialkanoic acids can be prepared according to various procedures. For example, suitable mixtures can be prepared by mixing mercaptoalkanoic acid with thiodialkanoic acid. A presently preferred procedure for preparing such mixtures of mercaptoalkanoic and thiodialkanoic acids is by hydrolyzing a mixture of mercaptonitriles and thiodinitriles which can be produced from alkenenitriles and hydrogen sulfide according to the processes known to the art such as described in U.S. Pat. No. 3,280,163. For example, according to one presently preferred embodiment, acrylonitrile is reacted with hydrogen sulfide to form a mixture of 3-mercaptopropionitrile and thiodipropionitrile which mixture is subsequently hydrolyzed, without the necessity of separation, to form a suitable mixture of 3-mercaptopropionic acid and thiodipropionic acid.

C. Alkyl Mercaptocarboxylates and Polythiobis(alkylcarboxylates)

The alkyl mercaptocarboxylates and polythiobis-(alkylcarboxylates) useful in preparing the mercaptan-terminated polymers of this invention by transesterification are described in U.S. Pat. No. 4,113,707, which is incorporated herein by reference. The method of transesterification, along with solvents, catalysts, etc., is also disclosed in U.S. Pat. No. 4,113,707, col. 5, line 7 to col. 6, line 26.

D. Polyether Polyol

The poly(oxyalkylene)-polyols or polyhydroxy polyethers employed according to the invention have on average at least 2.5 primary hydroxyl groups per molecule. Such polyhydroxy polyethers or poly(oxyalkylene)-polyols can have up to about twelve primary hydroxyl groups per molecule and molecular weights of from about 200 to about 20,000. These materials can be produced by end-capping a polyether-polyol with an alkylene oxide such as ethylene oxide. One commercial source for such type polyols is Wyandotte Chemicals which produces Pluracol TPE 4542 which is a liquid propylene oxide adduct of trimethylol propane terminated with ethylene oxide to give a high percentage of primary hydroxyl groups.

The initial (or original) polyether polyol before it is end-capped as herein described can be produced by the reaction of one or more epoxy-substituted hydrocarbons of the general formulas

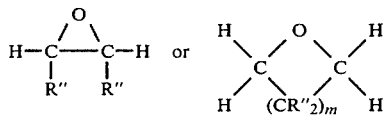

with a polyol of the general formula $Y(OH)_x$ wherein R" can be H or alkyl with the total number of carbon atoms in the molecule being in the range of up to and including about 20; and wherein m can be an integer of from 1 to about 10, preferably 1 to 3; and wherein Y can be a hydrocarbon moiety with at least two and ordinarily from 3 to 40 carbon atoms per moiety and a valence equal to the value of x, x being an integer of at least 2.5 and ordinarily from 3 to about 20, and the number of carbon atoms per molecule of $Y(OH)_x$ is equal to or greater than x.

Polyols that are employed in the preparation of the poly(oxyalkylene)-polyols or polyhydroxy polyethers used in this invention comprise hydroxy-substituted hydrocarbons that are preferably saturated aliphatics, saturated cycloaliphatics, aryls, or combinations thereof that are substituted with more than two and preferably at least three hydroxyl groups per molecule. In the presently preferred embodiment of this invention, these polyols $Y(OH)_x$, can have from two up to about 12 hydroxyl groups per molecule, and can contain from 3 to about 20 carbon atoms per molecule. Illustrative of the polyols useful in this invention that can be represented by the general formula $Y(OH)_x$ are ethylene glycol, 1,3-propanediol, 2-butene-1,4-diol, 1,4-cyclohexanediol, 2-ethylhexane-1,3-diol, glycerine, pentaerythritol, erythritol, 1,3,8-trihydroxycyclododecane, estriol, 1,4,5,8-naphthalenetetrol, di(p-hydroxyphenyl) phenyl methanol, 1,2,6-hexanetriol, 1,2,4,6,7,9,12,14,15,17,19,20-eicosanedodecol, and the like.

The poly(oxyalkylene)-polyols or polyhydroxy polyethers of this invention can be prepared by contacting at least one polyol of the formula $Y(OH)_x$, as defined above, with an epoxy-substituted hydrocarbon, as defined above, under suitable polymerization conditions, as is known to the art. For instance, glycerine can be contacted with an excess of propylene oxide (1,2-epoxypropane) under elevated pressure and in the presence of suitable polymerization promoters. Products of this type can also be obtained from commercial sources. Niax Polyol LHT-67 (a trademark of Union Carbide) is a commercial product of this type. In the preparation of poly(oxyalkylene)-polyols having on average more than two pendant hydroxyl groups per molecule, mixtures of the above polyols such as at least one diol and another polyol can be reacted with the epoxy-substituted hydrocarbons defined above to form poly(oxyalkylene)-polyols having more than two pendant hydroxy groups on average per molecule. For instance, a mixture of 1,4-butanediol and 1,2,6-hexanetriol can be reacted with ethylene oxide to produce a poly(oxyethylene)-polyol having an average of more than two pendant hydroxy groups per molecule. Alternatively, a poly(oxyalkylene)-polyol produced, e.g., by the reaction of a diol such as ethylene glycol with an alkylene oxide such as propylene oxide, can be mixed with another poly(oxyalkylene)-polyol produced, e.g., by the reaction of a triol such as 1,2,6-hexanetriol with an alkylene oxide such as propylene oxide. As yet another alternative, up to about 30 weight percent of the poly-(oxyalkylene)-polyol can be replaced with a polyol having recurring ester linkages, e.g., an average of about 2 to about 5 ester linkages per molecule, in place of at least a portion of the ether linkages, produced, e.g., by reaction of a lactone such as caprolactone with a polyol such as ethylene glycol or with an alkylene oxide-polyol condensation product such as diethylene glycol.

Illustrative examples of the epoxy-substituted hydrocarbons of the above-defined formulas that can be employed with the polyols to form the poly(oxyalkylene)-polyol include 1,2-epoxypropane, 1,2-epoxyethane, 1,2-epoxydocosane, 10,11-epoxydocosane, 2,3-epoxy-4,5-dimethyldodecane, 1,3-epoxypropane, 1,12-epoxydodecane, 1,12-epoxy-2,11-dibutyldodecane, 1,4-epoxy-2-(2,2-dimethyltetradecyl)-butane, and the like.

E. Sealant Formulation and Curing Agents

The poly(oxyalkylene)-polyester-poly(sulfide)-polythiol of this invention is readily oxidatively coupled or cured in an appropriate formulation to form a cured or coupled composition which is useful, e.g., as a sealant. The sealant comprises the poly(oxyalkylene)-polyester-poly(sulfide)-polythiol, a filler and a curing agent. The filler generally comprises an inert inorganic filler and a pigment, either inorganic or organic. Other materials may be present such as cure modifiers, plasticizers, extenders, stabilizers, modifiers, adhesion promoters, and the like. Generally the sealant will contain 10-99, preferably 25 to 75 percent of weight of the poly(oxyalkylene)-polyester-poly(sulfide)-polythiol, and the remainder non-elastomeric ingredients as set out hereinabove.

The poly(oxyalkylene)-polyester-poly(sulfide)-polythiols of this invention can be cured in a sealant formulation with conventional curing agents including free oxygen-containing fluids such as, for example, air; organic peroxide and hydroperoxides such as, for example, di-tert-butyl peroxide and cumene hydroperoxide; metal oxides such as, for example, the oxides of lead, zinc, manganese, calcium, barium, copper, mercury, tin and iron; metal salts of carboxylic acids such as, for example, lead stearate, zinc laurate, zinc acetate; ammonium persulfate; sulfur; and the like. The curing time will vary with the polymer, the curing agent, the sealant formulation, and the temperature. In general, sufficient curing agent is employed to convert at least about 70 percent of the pendant thiol groups to polysulfide groups.

The non-elastomeric components of the sealant formulations, the poly(oxyalkylene)-polyester-poly(sulfide)-polythiol of the invention and the curing agent can be blended together simultaneously and suitably agitated, for example, by machine blending, or the non-elastomeric materials can be premixed followed by addition of the poly(oxyalkylene)-polyester-poly(sulfide)-polythiol and then addition of the curing agent. The particular technique for blending the ingredients will depend upon available equipment and the requirements of the sealant application situation.

Following mixing together of the non-elastomeric materials, the poly(oxyalkylene)-polyester-poly(sulfide)-polythiols of the invention and the curing agents, the resultant sealant composition can be cured at ambient temperatures or at elevated temperatures if desired.

The sealants of this invention can be employed to join various substrates. For example, substrates such as wood, plastics, glass, stone such as granite, marble, or the like, concrete, or metals such as aluminum, steel, iron, zinc, or the like can be joined.

EXAMPLE I

This example illustrates a typical preparation of methyl 3-mercaptopropionate and 3,3'-thiobis(methylpropionate) referred to herein as mixed esters. The 3,3'-thiobis(methylpropionate) is also known as dimethyl thiodipropionate. The mixed esters are one of the ingredients used to prepare the poly(oxyalkylene)-polyester-poly(sulfide)-polythiol polymer described herein.

Into a 1-gallon stainless steel reactor fitted with a stirrer, pressure gauge, temperature measuring device and internal cooling coil was placed methanol (600 ml), concentrated ammonium hydroxide (28 weight percent $NH_3$, 21.6 g), sulfur (12 g) and hydrogen sulfide (816 g). Methyl acrylate (1376 g) was introduced into the stirred reactor over a 45 minute interval. Over the reaction period the temperature of the reaction mixture increased from 23° to 53° C. while the pressure decreased from 1650 kPa (240 psig) to 1150 kPa (169 psig). After an additional 30 minute period of stirring the reactor was vented to release excess hydrogen sulfide and the remaining reaction solution was transferred to a fractionation apparatus.

A total of 5 runs were made as described above. The resulting reaction mixtures were combined prior to fractional distillation.

A fraction (5889 g) was collected over a boiling range of 87°–93° C. at 50 torr (mm Hg) pressure which contained 98.6 weight percent methyl 3-mercaptopropionate (analyzed by GLC, i.e., gas-liquid chromatography). The undistilled pot residue (3005 g) contained 85 weight percent 3,3'-thiobis(methylpropionate) and 15 weight percent 3,3'-dithiobis(methylpropionate) (analyzed by GLC).

EXAMPLE II

This example illustrates a typical preparation of the poly(oxyalkylene)-polyester-poly(sulfide)-polythiol from the mixed esters and a polyol wherein the terminal hydroxyl groups on the polyol molecule are secondary. The polymer thus prepared is considered to be the control polymer in this invention.

Into a 3 liter, stirred, heated glass reactor was added polyether polyol (550 g of LHT-34 from Union Carbide—derived from 1,2,6-hexanetriol and propylene oxide, having a molecular weight of about 4500 and a hydroxyl number which is the milliequivalents of OH groups per gram of polyol of about 34). Nitrogen (0.056 $m^3$/hr) was bubbled through the stirred reactor and the contents maintained at 100° C. for 1 hour to remove residual water. The nitrogen flow was then reduced to 0.0056 $m^3$/hr, a reflux condenser was attached and methyl 3-mercaptopropionate (25.9 g fraction described above), sulfide-disulfide mixture (14.1 g—undistilled pot residue described above), and tetrabutyl titanate (0.2 ml, du Pont's Tyzor TBT, essentially 0.2 g pure tetrabutyl titanate) were added to the reactor. The weight ratio of methyl 3-mercaptopropionate and the pot residue described herein was 65/35. The stirred reaction mixture was maintained at 177° C. for 24 hours. The nitrogen flow through the reaction mixture swept out the methanol formed in the transesterification reaction. At the end of the 24 hour period, the reflux condenser was removed and the nitrogen flow rate was increased to 0.056 $m^3$/hr with the temperature maintained at 177° C. for 1 hour to remove volatiles. The resultant poly(oxyalkylene)-polyester-poly(sulfide)-polythiol possessed 0.94 weight percent mercaptan sulfur and a viscosity of 5600 centipoises at 25° C.

EXAMPLE III

This example illustrates the preparation of the inventive polymer, poly(oxyalkylene)-polyester-poly(sulfide)-polythiol from the mixed esters from Example I and a polyol similar to the one used in Example II with the main exception that the terminal hydroxyl groups on the polyol molecule are primary. The procedure described in Example II was repeated but the polyether polyol LHT-34 with secondary hydroxyl end-groups was replaced with a polyether polyol having primary hydroxyl end-groups (504 g of TPE-4542 from Wyandotte Chemicals derived from trimethylolpropane and propylene oxide terminated with ethylene oxide, having a molecular weight of about 4500 and a hydroxyl number of 37.3). The resultant poly(oxyalkylene)-polyester-poly-(sulfide)-polythiol possessed 1.08 wt. percent mercaptan sulfur and a viscosity of 5600 centipoises at 25° C.

EXAMPLE IV

This example illustrates the preparation of the inventive polymer described herein employing the primary hydroxy end-group but where the weight ratio of methyl 3-mercaptopropionate to heavies, 3,3'-thiobis(methylpropionate) and 3,3'-dithiobis(methylpropionate), is changed from 65/35 as in Examples II and III to 60/40. Thus, the procedure described in Example II was again repeated employing the following charge: 504 g TPE 4542 polyol, 23.9 g methyl 3-mercaptopropionate, 15.9 g heavies (described herein), and 0.2 ml TBT catalyst. The resultant poly(oxyalkylene)-polyester-poly(sulfide)-polythiol possessed 0.90 wt. percent mercaptan sulfur and a viscosity of 8800 centipoises at 25° C.

EXAMPLE V

This example illustrates the preparation of the inventive polymer described herein employing the primary hydroxyl end-group polyol but where the weight ratio of methyl 3-mercaptopropionate to heavies was 55/45. Thus, the procedure described in Example II was again repeated employing the following charge: 504 g TPE 4542 polyol, 21.7 g methyl 3-mercaptopropionate, 17.8 g heavies (described herein), and 0.2 ml TBT catalyst. The resultant poly(oxyalkylene)-polyester-poly(sulfide)-polythiol possessed 0.85 wt. percent mercaptan sulfur and a viscosity of 13,400 centipoises at 25° C.

EXAMPLE VI

This example illustrates the use of polymers prepared herein (Examples II, III, IV, and V) in sealant formulations.

The formulation employed is given in the following recipe:

Recipe

| Sealant Formulation | Parts by Weight |
|---|---|
| Polymer | 35 |
| Chlorinated paraffin[1] | 3.8 |
| Calcium carbonate[2] | 39.3 |
| Titanium dioxide | 18.8 |
| Fumed silica[3] | 2.5 |
| Stabilizer[4] | 0.28 |
| Carbon black[5] | 0.185 |
| Yellow pigment[6] | 0.093 |
| Iron oxide[7] | 0.093 |
| Curing Agent | |
| Lead dioxide[8] | 1.05 |
| Dibutyl phthalate[8] | 1.05 |
| Water | 0.78 |

[1]Chlorafin 50 from Monsanto, a light yellow, viscous oil.
[2]Hi Pflex 100 from Pfizer Minerals
[3]Cab-O-Sil, M-5, from the Cabot Corp.
[4]2,2'-Methylenebis(4-methyl-6-t-butylphenol), Cyanamid 2246 from American Cyanamid Corp.
[5]N765 from Phillips Petroleum Co.
[6]1476 from Harshaw Chemical Co.16 [7]R-2199 from Pfizer Minerals.
[8]C-5500 from G. P. Roeser, Inc.

After the above sealant formulation was prepared, the curing agent components were added and the resulting sealant was heated at 70° C. for 24 hours. Table I gives the properties of the resultant cured sealants along with the properties of the base polymer that was prepared from the two types of polyols, one with secondary hydroxyl end-groups (control, Example II) and one with primary hydroxyl end-groups/invention, Examples III, IV, V).

TABLE I

| | Control | Inventive Base Polymers | | |
|---|---|---|---|---|
| | Example II | Example III | Example IV | Example V |
| A. Polymer Properties: | | | | |
| 1. MMP/heavies wt. % ratio | 65/35 | 65/35 | 60/40 | 55/45 |
| 2. Wt. % Mercaptan sulfur | 0.94 | 1.08 | 0.90 | 0.85 |
| 3. Viscosity, cps., 25° C. | 5600 | 5600 | 8800 | 13,400 |
| B. Cured Sealant Properties: | | | | |
| 1. 50% Modulus, psi[a] | 60 | 126 | 135 | 126 |
| 2. Tensile Strength, psi[a] | 145 | 173 | 189.5 | 192 |
| 3. Elongation, %[a] | 600 | 225 | 257 | 223 |
| 4. Surface condition | tacky | non-tacky | non-tacky | non-tacky |

[a]ASTM D 888-56T

The results in Table I demonstrate that poly(oxyalkylene)-polyester-poly(sulfide)-polythiol polymers prepared from polyols having primary hydroxyl endgroups yield cured sealant compositions having non-tacky surfaces whereas the same polymer prepared from polyols having secondary hydroxyl end-groups yield cured sealant compositions having initially tacky surfaces. Based on the same sealant recipe, the inventive polymers give sealant compositions with higher modulus and tensile strengths which can be easily increased or reduced by adjusting the amounts of sealant components such as plasticizer and fillers. The % elongation is less than the control (Example I) but still at a high enough value to provide satisfactory elasticity.

We claim:

1. An improved sealant composition having non-tacky surfaces prepared by curing a mixture comprising:
   (a) a poly(oxyalkylene)-polyester-poly(sulfide)-polythiol having more than two pendant thiol groups per molecule;
   (b) a curing agent in an amount sufficient to convert at least 70% of the mercapto groups to polysulfide linkages; and
   (c) the balance being non-elastomeric components selected from fillers, plasticizers, antioxidants, adhesion promoters, and the like, the improvement comprising forming said polythiol (a) by reacting at least one of a mercapto acid and a mercapto acid ester with a polyether polyol having on average at least 2.5 primary hydroxyl end groups per molecule.

2. A composition according to claim 1 wherein said polyether polyol is prepared by end-capping a polyether polyol with ethylene oxide prior to esterification.

3. A composition according to claim 1 wherein the amount of (a) ranges from about 10 to about 99 weight percent.

4. A composition according to claim 1 wherein (a) is formed by reacting a mixture of esters comprising methyl 3-mercaptopropionate and 3,3'-thiobis(methylpropionate) with a polyether polyol derived from trimethylolpropane and propylene oxide terminated with ethylene oxide to provide primary hydroxyl end groups.

5. In a process for the preparation of a poly(oxyalkylene)-polyester-poly(sulfide)-polythiol having on average more than two pendant thiol groups per molecule which comprises reacting in the presence of an esterification catalyst
   (a) a mixture of (1) a mercaptocarboxylic acid and a thiodicarboxylic acid or
(2) an alkyl mercaptocarboxylate and a poly-thiobis(alkylcarboxylate) with
(3) a polyether polyol, the improvement for producing a polythiol curable to a sealant composition having non-tacky surfaces comprising reacting as said polyether polyol
at least one polyether polyol having on average at least 2.5 primary hydroxyl end groups per molecule.

6. A method according to claim 5 wherein said (a) (2) comprises a mixture of methyl 3-mercaptopropionate and 3,3'-tiobis(methylpropionate) and said polyether polyol is derived from trimethylolpropane and propylene oxide terminated with ethylene oxide.

7. A process according to claim 5 wherein said polyether polyol is end-capped with ethylene oxide prior to esterification.

8. A polymer prepared by the method of claim 5.

9. A sealant comprising the polymer of claim 8 plus a filler and a curing agent.

10. A method according to claim 5 wherein said esterification catalyst is tetrabutyltitanate.

11. A process for the production of a sealant which comprises
(a) preparing a poly(oxyalkylene)-polyester-poly(sulfide)-polythiol as defined in claim 5 and
(b) adding to said polythiol obtained in step (a), a curing agent in an amount sufficient to convert at least 70% of the mercapto groups to polysulfide linkages and allowing same to cure to form a sealant having non-tacky properties.

12. A process according to claim 11 wherein nonelastomeric components selected from fillers, plasticizers, antioxidants, and adhesion promoters are incorporated into the formulation.

13. A process according to claim 11 wherein said polythiol is formed by the reaction of methyl 3-mercaptopropionate and 3,3'-thiobis(methylpropionate) with a polyether polyol derived from trimethylolpropane and propylene oxide terminated with ethylene oxide.

14. A process according to claim 13 wherein the curing agent is lead dioxide and further wherein a filler, plasticizer, and an antioxidant are incorporated therein.

* * * * *